United States Patent [19]
Nesheiwat et al.

[11] Patent Number: 4,801,664
[45] Date of Patent: Jan. 31, 1989

[54] ACID WASH OF POLYARYLENE SULFIDES

[75] Inventors: Afif M. Nesheiwat, Bartlesville, Okla.; Guy Senatore, Borger, Tex.; Fred T. Sherk, Bartlesville, Okla.

[73] Assignee: Phillips Petroleum Company, Bartlesville, Okla.

[21] Appl. No.: 149,760

[22] Filed: Jan. 29, 1988

[51] Int. Cl.[4] .................................................. C08G 23/00
[52] U.S. Cl. ................................... 525/537; 528/486; 528/487; 528/490
[58] Field of Search ................. 528/486, 487, 490; 525/537

[56] References Cited

U.S. PATENT DOCUMENTS

| | | | |
|---|---|---|---|
| 3,457,242 | 7/1969 | Hill, Jr. ......................... | 260/79 |
| 3,658,753 | 4/1972 | Reed et al. ..................... | 260/45.7 |
| 3,839,301 | 10/1984 | Scoggins ........................ | 260/79 |
| 3,879,355 | 4/1975 | Blackwell ....................... | 260/79 |
| 3,948,865 | 4/1976 | Brady et al. .................... | 260/79 |
| 4,178,433 | 12/1979 | Smith ............................ | 528/381 |
| 4,373,091 | 2/1983 | Edmonds, Jr. ................... | 528/481 |
| 4,424,338 | 1/1984 | Cleary .......................... | 528/388 |
| 4,433,138 | 2/1984 | Idel et al. ..................... | 528/388 |
| 4,500,702 | 2/1985 | Ostlinning et al. .............. | 528/388 |
| 4,728,723 | 3/1988 | Nakamura et al. ................ | 528/486 |

FOREIGN PATENT DOCUMENTS

| | | |
|---|---|---|
| 0087038 | 8/1983 | European Pat. Off. . |
| 0216116 | 4/1987 | European Pat. Off. . |
| 0242617 | 10/1987 | European Pat. Off. . |
| 0244187 | 11/1987 | European Pat. Off. . |
| 3205992 | 9/1983 | Fed. Rep. of Germany . |
| 0185625 | 10/1983 | Japan . |

*Primary Examiner*—Harold D. Anderson
*Assistant Examiner*—T. Mason
*Attorney, Agent, or Firm*—Paul S. Chirgott

[57] ABSTRACT

In one embodiment, a process is provided for treating virgin poly(arylene sulfide) resins, wherein a heated polymer slurry, comprising a virgin poly(arylene sulfide) resin and water is contacted by an acidic treating solution comprising at least an acidic component, wherein the amount of the acidic component in the acidic treating solution is less than the amount necessary to result in at least a partial curing of the virgin poly(arylene sulfide) resin. In a second embodiment, the process is provided for treating a virgin poly(arylene sulfide) resin, wherein the virgin poly(arylene sulfide) resin is slurried with an aqueous acidic treating solution comprising an acidic component and an aqueous component and the concentration of the acidic component in the aqueous acidic treating solution is less than the amount necessary to result in at least a partial curing of the virgin poly(arylene sulfide) resin. The polymer slurry is then heated to an elevated temperature, below the melting point of the virgin resin, while in the substantial absence of a gaseous oxidizing atmosphere.

60 Claims, 3 Drawing Sheets

ACID WASH OF POLYARYLENE SULFIDES

FIELD OF THE INVENTION

This invention relates to poly(arylene sulfide)s. It relates broadly to a method for preparing poly(arylene sulfide)s. In a specific aspect, the invention relates to the production of thermally stable poly(arylene sulfide) resins and products produced therefrom having improved melt flow rates, and/or rates of cure.

BACKGROUND

Poly(arylene sulfide)s (henceforth PAS) have become commercially important resins. The products prepared therefrom are finding increasing utility because of their outstanding durability, toughness, inertness, and versatility. Such resins, although having relatively high melting points, are thermoplastic.

The virgin (i.e., substantially linear and uncurved) PAS resins generally have a relatively high melt flow, e.g., about 3000 to about 10,000 grams/10 minutes. For some purposes, such as encapsulation and coating, it is desirable to have PAS resins with a melt flow greater than about 15,000 grams/10 minutes. However, for other purposes, such as molding, film making and fiber making, the resins should have a melt flow in the range from about 10 to about 3,000 grams/10 minutes. Since virgin PAS resins generally have a melt flow ranging from about 3000 to about 10,000 grams/10 minutes, if such a resin is to be employed in moldings or the making of polymeric films and/or fibers, the virgin resin must have its melt flow value decreased. Conversely, if such a polymeric resin is to be employed for the purpose of encapsulations and/or coatings, the virgin PAS resin must have its meld flow value increased.

One conventional method of decreasing the melt flow of virgin PAS resins, which is synonymous with increasing the virgin resins' molecular weight, is by a process referred to in the industry as "curing". The extent to which the resin is cured and the final melt flow valve obtained are controlled depending upon the intended end use of the polymer. One method of curing a PAS resin is to subject the resin to an elevated temperature below its melting point while in the presence of a gaseous oxidizing atmosphere. This method of curing virgin PAS resins is generally long and tedious.

It is known that the rate at which a virgin PAS resin cures is generally proportional to the temperature at which the resin is being cured. Therefore, one method of increasing the rate at which a virgin PAS resin is cured is by employing a higher curing temperature. However, since it is desirable to maintain the curing temperature below the melting point of the resin, the extent that the temperature may be increased is limited to the specific resin's melting point. Accordingly, it is an object of this invention to provide a process for increasing the rate at which PAS resins cure without increasing the curing temperature.

Furthermore, it is also desirable to have virgin PAS resins which are thermally stable in the melt. In other words, it is desirable to have PAS resins whose melt flow values do not substantially change while the resins are held at a temperature above their melting point for a period of time, such as, for example, during molding and extrusion procedures. Accordingly, another object of this invention is to provide a process for preparing thermally stable PAS resins.

A further object of this invention is to provide a process producing PAS resins having varying melt flow properties which have specific fields of utility.

Other objects, aspects and advantages of the invention will be apparent to those skilled in the art upon reading the specification and appended claims.

SUMMARY OF THE INVENTION

In accordance with one embodiment of this invention, a process is provided for treating a virgin poly(arylene sulfide) resin comprising: (a) contacting the virgin poly(arylene sulfide) resin with an aqueous acidic treating solution to form a polymer slurry, wherein the aqueous acidic treating solution comprises an acidic component and an aqueous component and the concentration of the acidic component in the aqueous acidic treating solution is less than the amount necessary to result in at least a partial curing of the virgin poly(arylene sulfide) resin, (b) treating the virgin poly(arylene sulfide) resin by heating the polymer slurry, while in the substantial absence of a gaseous oxidizing atmosphere, to an elevated temperature but below the melting point of the virgin poly(arylene sulfide) resin, and (c) recovering the treated poly(arylene sulfide) resin from the polymer slurry in a manner which does not result in at least a partial curing of the treated poly(arylene sulfide) resin.

In accordance with the second embodiment of this invention, a process is provided for treating a virgin poly(arylene sulfide) resin comprising: (a) contacting the virgin poly(arylene sulfide) resin with water to form a polymer slurry, (b) heating the polymer slurry, while in the substantial absence of a gaseous oxidizing atmosphere, to an elevated temperature but below the melting point of the virgin poly(arylene sulfide) resin, (c) treating the virgin poly(arylene sulfide) resin by adding to the polymer slurry, while in the substantial absence of a gaseous oxidizing atmosphere, an acidic treating solution comprising at least an acidic component, wherein the amount of the acidic component in the acidic treating solution is less than the amount necessary to result in at least a partial curing of the virgin poly-(arylene sulfide) resin, and (d) recovering the treated poly(arylene sulfide) resin from the polymer slurry in a manner which does not result in at least a partial curing of the treated poly(arylene sulfide) resin.

Both above embodiments of this invention result in thermally stable PAS resins which have higher melt flow values and which cure faster than their untreated counterparts.

DETAILED DESCRIPTION

Figure 1:
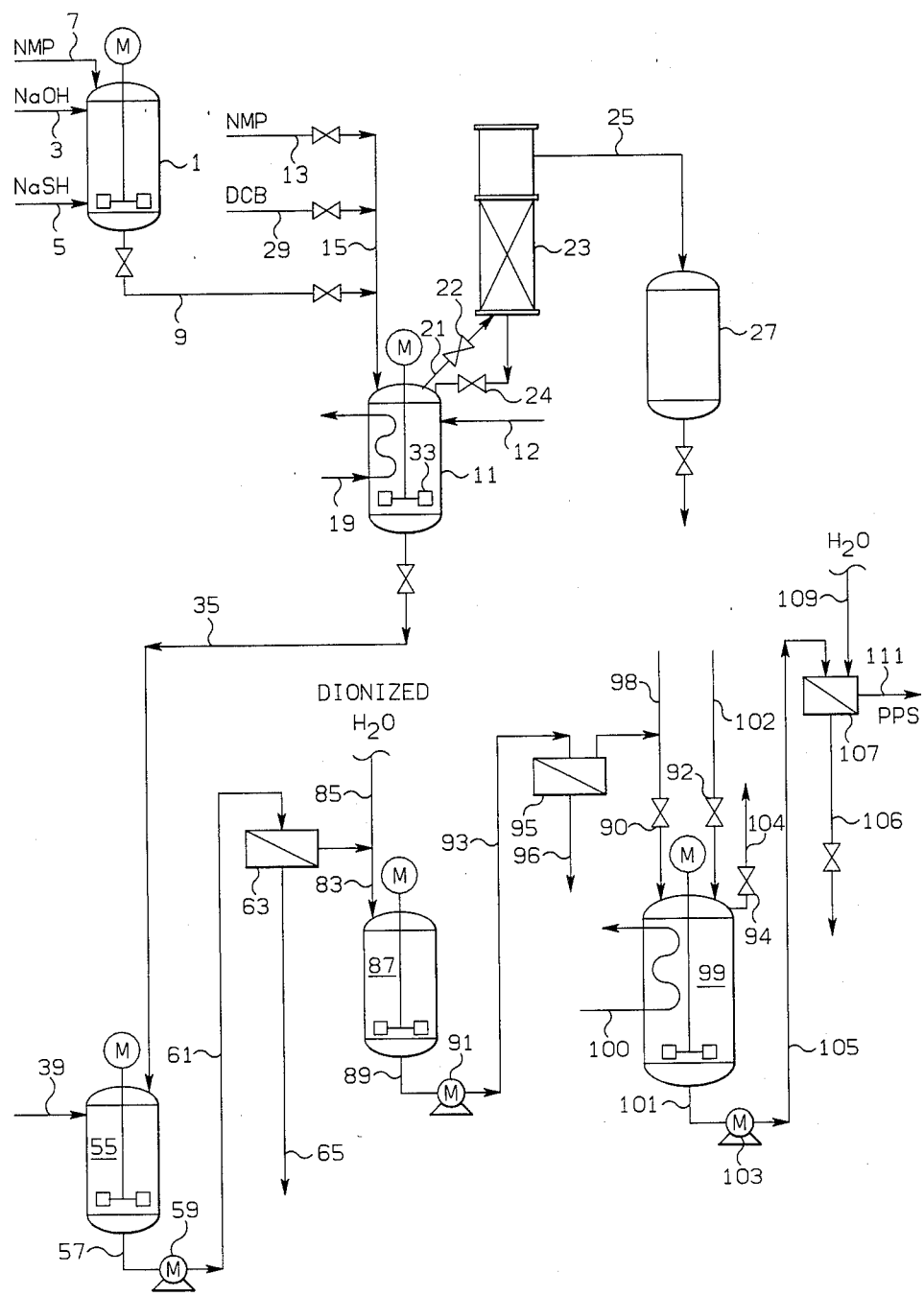
FIG. 1 is a schematic representation of a process for preparing a virgin poly(phenylene sulfide) resin and treating the virgin resin in accordance with the embodiments of this invention.

The terms "arylene sulfide polymer" and "poly(arylene sulfide)" abbreviated as "PAS", as used in this specification are intended to include polymers of the type which are prepared by reacting dihaloaromatic compounds with a sulfur source in the presence of a polar organic compound. The resulting polymers contain the aromatic structure of the dihalo compound coupled in repeating units through a sulfur atom.

This invention is broadly applicable to PAS resins wherein dihalo-substituted aromatic compounds are reacted with sulfur-containing reactants in a polar organic compound, either in batch or continuous operations. Generally, the polymers which are prepared for use in this invention, because of the availability of the materials from which they are prepared, are those having the repeating unit R-S, wherein R is phenylene, biphenylene, naphthylene, biphenylene ether, or a lower alkyl-substituted derivative thereof. The phrase "lower alkyl", as used herein, refers to aklyl groups having 1 to 6 carbon atoms. Examples of such lower alkyls include, but are not limited to, methyl, propyl, isobutyl, n-hexyl, and the like. Moreover, preferred polymers generally have melting points above 200° C. (392° F.), more preferably, in the range from about 200° C. (392° F.) to about 500° C. (932° F.).

Although other polymeric resins are not excluded, in general, the poly(arylene sulfide) polymers, treated by the processes of this invention, are those wherein the arylene group is a phenylene group. Generally, the processes of this invention can be used to improve the properties of phenylene sulfide polymers selected from the group comprising poly(phenylene sulfide), poly(phenylene sulfide ketone), poly(phenylene sulfide diketone), and poly(biphenylene sulfide).

The term "virgin", when used to identify a type of PAS resin, refers to substantially linear, low molecular weight PAS resins which have not been subjected to any oxidative heat treatment (i.e., curing), and wherein no molecular weight modifying agents have been used in the production of the resins. Examples of molecular weight modifying agents include, but are not limited to, alkali metal carboxylates and trichlorobenzene.

As used herein, the terms "melt flow" and/or "flow rate" refer to the rate at which a melted PAS resin flows through an orifice when subjected to a downward pressure. Flow rate is recorded in units of grams of extrudate collected over a 10 minute interval (g/10 min) and is based on a modified version of ASTM D1238, Procedure B. For example, in determining the flow rate for poly(phenylene sulfide) resins, having a melting point of about 285° C. (515° F.), the resin is subjected to test conditions 315/3.0, where the temperature in degree Celsius is shown first followed by the weight in kilograms. The modification employed is that the preheating time is 5 minutes as opposed to the minimum 6 minute period which ASTM D1238 specifies.

As used herein, the term "thermal stability" refers to the degree of change in the melt flow values of a resin sample while the resin is held at a temperature above its melting point for different periods of time. As the thermal stability of a given resin improves, the degree at which the resin's melt flow value changes over time decreases. Generally, a resin's thermal stability is determined by measuring a resin's melt flow value after being retained in the barrel of the melt index apparatus of ASTM D1238 for 5 minutes and for 30 minutes, while internal temperature of the apparatus is maintained at or above the melting point of the PAS resin being tested. Specifically, when testing the thermal stability of poly(phenylene sulfide), the internal temperature of the apparatus of ASTM D1238 is maintained at 600° F. (316° C.). If there is little or no change between the 5 minute and the 30 minute melt flow values, the resin being tested is said to be thermally stable. The 30 minute meltflow value of a PAS resin which is not thermally stable can change by more than 200 percent of the resin's 5 minute melt flow value. For purposes of this invention, if the 30 minute melt flow value of a PAS resin changes by less than ±50 percent of the 5 minute melt flow value, the resin is said to be thermally stable.

The phrase "polymer slurry", as used herein, refers to a slurry comprising a particulate polymer resin and a liquid medium. Generally, the amount of PAS resin present in the polymer slurry ranges from about 1 weight percent to about 50 weight percent, preferably from about 5 weight percent to about 40 weight percent, even more preferably from about 10 weight percent to about 30 weight percent. The above weight percentages are based on the total weight of the polymer slurry.

In accordance with a first embodiment of this invention, a process is provided for treating a virgin PAS resin comprising: (a) contacting the virgin PAS resin with an aqueous acidic treating solution to form a polymer slurry, wherein the aqueous acidic treating solution comprises an acidic component and an aqueous component and the concentration of the acidic component in the aqueous acidic treating solution is less than the amount necessary to result in at least a partial curing of the virgin PAS resin, (b) treating the virgin PAS resin by heating the polymer slurry, while in the substantial absence of a gaseous oxidizing atmosphere, to an elevated temperature but below the melting point of the virgin PAS resin, and (c) recovering the treated PAS resin from the polymer slurry in a manner which does not result in at least a partial curing of the treated PAS resin.

In accordance with a second embodiment of this invention, a process is provided for treating a virgin PAS resin comprising: (a) contacting the virgin PAS resin with water to form a polymer slurry, (b) heating the polymer slurry, while in the substantial absence of a gaseous oxidizing atmosphere, to an elevated temperature but below the melting point of the virgin PAS resin, (c) treating the virgin PAS resin by adding to the polymer slurry, while in the substantial absence of a gaseous oxidizing atmosphere, an acidic treating solution comprising at least an acidic component, wherein the amount of the acidic component in the acidic solution is less than the amount necessary to result in at least a partial curing of the virgin PAS resin, and (d) recovering the treated PAS resin from the polymer slurry in a manner which does not result in at least a partial curing of the treated PAS resin.

Both above embodiments of this invention result in thermally stable PAS resins which have higher melt flow values and which cure faster than their untreated counterparts.

Any suitable organic or inorganic acids which are water soluble can be used in the acidic treating solution for either embodiment mentioned above. Examples of suitable organic acids include, but are not limited to, acetic acid, formic acid, oxalic acid, fumaric acid, and monopotassium phthalic acid. The presently preferred organic acid is acetic acid. Examples of suitable inorganic acids include, but are not limited to, hydrochloric acid, monoammonium phosphate, sulfuric acid, phosphoric acid, boric acid, nitric acid, sodium dihydrogen phosphate, ammonium dihydrogen phosphate, carbonic acid, and $H_2SO_3$. The presently preferred inorganic acid is hydrochloric acid.

When practicing either embodiment of this invention, the amount of the acidic component within the acidic treating solution must be such that substantially no oxidative curing of the resin will occur during the treating process. In other words, the amount of the acidic component, present in the acidic treating solution, must be such that, when the acidic treating solution contacts the virgin PAS resin, at an elevated temperature but below the melting point of the virgin resin, the amount of the acidic component does not result in a decrease of the resin's melt flow value. Generally, the pH of the acidic treating solution should be greater than 1.0, preferably, greater than 2.0, more preferably greater than 4.0.

The maximum amount of the acidic component which can be used in treating a virgin PAS resin in accordance with the embodiments of this invention, will depend upon the oxidative strength of the acid. In other words, the maximum amount of an acidic component having strong oxidative characteristics, which can be used in treating a virgin PAS resin in accordance with the embodiments of this invention, will be less than the maximum amount of an acidic component having weak oxidative characteristics. This maximum amount can readily be determined by one skilled in the art.

When practicing the first embodiment of this invention, the amount of the acidic component present in the acidic treating solution will generally not exceed about 10 weight percent of the total weight of the aqueous acidic treating solution. Preferably, the amount of the acidic component present in the aqueous acidic treating solution ranges from about 0.01 weight percent to about 10 weight percent, more preferably, from about 0.025 weight percent to about 5 weight percent, and even more preferably from about 0.075 weight percent to about 1 weight percent, wherein the above weight percentages are based on the total weight of the aqueous acidic treating solution.

When treating a virgin PAS resin in accordance with the second embodiment of this invention, the amount of the acidic component present in the acidic treating solution will generally not, exceed about 10 weight percent of the sum of the weights of the water used to slurry the virgin PAS resin and the acidic treating solution. Preferably, the amount of the acidic component present ranges from about 0.01 weight percent to about 10 weight percent, more preferably from about 0.025 weight percent to about 5 weight percent, and even more preferably from about 0.075 weight percent to about 1 weight percent, wherein the above weight percentages are based on the sum of the weights of the water used to slurry the virgin PAS resin and the acidic treating solution.

When treating a virgin PAS resin in accordance with either embodiment of this invention, the treating process is conducted at an elevated temperature which does not exceed the melting point of the virgin PAS resin. Generally, the treating process is conducted at an elevated temperature within the range from about 165° C. below the melting point of the virgin PAS resin, preferably, in the range from about 14° C. to about 150° C. below the melting point of the virgin PAS resin.

The concentration of the virgin PAS resin in the polymer slurry is such that the acidic treating solution sufficiently contacts the virgin PAS resin. Generally, the concentration of the virgin PAS resin in the polymer slurry ranges from about 1 weight percent to about 50 weight percent. Preferably from about 5 weight percent to about 40 weight percent, and even more preferably from about 9 weight percent to about 20 weight percent, wherein the above weight percentages are based on the total weight of the polymer slurry.

This invention can be used to treat virgin PAS resins at any point in time after the resin has been polymerized but before the resin has been subjected to an oxidative curing process. For example, this invention can be used to treat virgin PAS resins before or after the resins are recovered. In commercial applications, however, it is preferable to treat the virgin PAS resin during the initial recovery process of the virgin resin.

To demonstrate one method of incorporating the embodiments of this invention, a polymerization reaction process is described below. The polymerization process is illustrated by FIG. 1 which is a schematic representation of a process for producing a virgin poly(phenylene sulfide) and treating the virgin poly(phenylene sulfide) in accordance with this invention.

Referring now to FIG. 1 aqueous solutions of a caustic solution (e.g., NaOH) and an alkali metal hydrosulfide (e.g., NaSH) are fed into stirred vessel 1 through lines 3 and 5, respectively and allowed to react. A polar organic compound (e.g., N-methyl-2-pyrrolidone, henceforth "NMP") is fed through line 7 into stirred vessel 1 to flush all of the material from vessel 1 through line 9 into stirred vessel 11 which serves as a dehydration/polymerization reactor.

A second charge of a polar organic compound (e.g., NMP) is fed through line 13 into line 15 which introduces the NMP compound into the dehydration/polymerization vessel 11. The contents of vessel 11 are heated by heating coils 19 to a temperature sufficient to dehydrate the mixture therein. Rising vapors, passing through line 21, are fractionated in distillation column 23. Condensed water is passed through line 25 to be collected in dehydration accumulator 27.

After the dehydration process, the distillation column 23 is isolated from vessel 11 by closing valves 22 and 24. The monomer (e.g., p-dichlorobenzene, henceforth "DCB") is added through line 29 into line 15 which introduces the DCB into vessel 11. The mixture in vessel 11 is stirred while being heated, by heating coils 19, to a temperature sufficient to effect polymerization.

After the polymerization reaction is completed, a sufficient amount of a phase separation agent is added into vessel 11 through line 12 to facilitate the separation of the molten poly(phenylene sulfide) phase from the second liquid phase comprising the NMP compound phenylene sulfide oligomers, salt and unreacted reactants. During the phase separation, the reaction mixture is vigorously stirred by agitator 33 to disperse the polymer phase. The temperature of the reactor is reduced so tha after the separation, the liquid polymer phase gradually solidifies as the temperature of the reaction mixture drops below the polymer's liquid-to-solid phase transition temperature.

The reaction mixture effluent, comprising the particulate virgin poly(phenylene sulfide) resin, NMP, salt and water, is transferred through line 35 into stirred dilution tank 55. Water is added through line 39 is a sufficient quantity to dissolve a major portion of water soluble salts.

The effluent from tank 55 is transferred through line 57, pump 59 and line 61 to porous metal filter screen 63 where solids are collected as a filter cake, comprising particulate virgin poly(phenylene sulfide) resin, water, and small amounts of NMP and impurities, while the filtrate is passed through line 65 and sent for NMP recovery.

The virgin resin, from the porous metal filter screen 63 is passed through line 83 along with deionized water added through line 85 to be slurried in stirred wash tank 87 to remove salt and impurities from the virgin poly(phenylene sulfide) particles. Effluent from tank 87 is passed through line 89, pump 91 and line 93 to a second porous metal filter screen 95 where polymer solids are again collected as a filter cake. The filtrate is passed through line 96 and is generally either recycled (not shown) or discarded.

The now washed virgin poly(phenylene sulfide) resin from porous metal filter screen 95 is passed through line 97 to stirred wash tank 99. It is in this stirred wash vessel that the virgin poly(phenylene sulfide) resin is treated in accordance with the embodiments of this invention.

Specifically, when treating the virgin poly(arylene sulfide) resin in accordance with the first embodiment of the invention, the virgin poly(phenylene sulfide) is passed through line 97 along with an aqueous acidic treating solution added through line 98 to be reslurried in wash tank 99. The virgin poly(phenylene sulfide) filter cake is then reslurred in wash tank 99. After reslurrying, wash tank 99 is purged with nitrogen gas to remove substantially all of any gaseous acidizing atmosphere which may be present. Wash tank 99 is then sealed off using valves 90, 92 and 94.

While stirring, the polymer slurry is heated by means of heat transfer coils 100 to a temperature not exceeding the melting point of the virgin poly(phenylene sulfide) resin. The polymer slurry is then cooled and the wash tank vented through valve 94 and line 104. The cooled effluent from wash tank 99 is passed through line 101, pump 103, and line 105 to a third porous metal filter screen 107 upon which solids are again collected. These solids comprise the now acid-treated poly(phenylene sulfide) resin. The filtrate is passed through line 106 and is generally either recycled (not shown) or discarded. The filter cake collected on filter screen 107, comprising the now acid-treated poly(phenylene sulfide) resin, is washed with water from line 109. After washing, the acid-treated poly(phenylene sulfide) resin is transferred through line 111 as recovered acid-treated poly(phenylene sulfide). This acid-treated polymer is then dried and, optionally, cured.

When practicing the second embodiment of this invention, the virgin poly(phenylene sulfide) filter cake from porous metal screen 95 is reslurried in wash tank 99 with a sufficient amount of water being added through line 98. After reslurrying, wash tank 99 is purged with nitrogen gas to remove substantially all of any gaseous oxidizing atmosphere which may be present. Wash tank 99 is purged with nitrogen to remove substantially all of any gaseous oxidizing atmosphere which may be present. Wash tank 99 is then sealed off using valves 90, 92 and 94. While stirring, the polymer slurry is heated by means of heat transfer coils 100 to a temperature not exceeding the melting point of the virgin poly(phenylene sulfide) resin. An acidic treating solution is then added pressurized into wash tank 99 through line 102.

The addition process is conducted in such a manner as to prevent the introduction of any oxidizing gas into heated wash tank 99. One such method of addition is by pressurizing the acidic treating solution into heated wash tank 99. The mixture of polymer slurry containing the acidic treating solution is then stirred while being maintained at the elevated temperature. The polymer slurry is then cooled and the wash tank vented through valve 94 and line 104. The cooled effluent from wash tank 99 is passed through line 101, pump 103 and line 105 to a third porous metal filter screen 107 upon which solids are again collected. These solids comprise the a now acid-treated poly(arylene sulfide) resin. The filtrate is passed through line 106 and is generally either recycled (not shown) or discarded. The filter cake collected on filter screen 107, comprising the now acid-treated poly(phenylene sulfide) resin, is washed with water from line 109. After washing, the acid-treated poly(phenylene sulfide) resin is transferred to line 111 as recovered acid-treated poly(phenylene sulfide). This acid treated polymer is then dried and, optionally, cured.

In either of the above embodiments, the recovery and drying processes of the acid-treated poly(phenylene sulfide) should result in substantially no oxidative curing of the polymeric resin. For example, if the drying process is conducted at a temperature at or above 100° C., the drying vessel should be substantially free of any gaseous oxidizing atmosphere. If, however, the drying process is conducted at a temperature below 100° C., drying must be done in a vacuum so that the aqueous component of can be vaporized from the filter cake. Moreover, if drying is below 100° C., the presence of a gaseous oxidizing atmosphere will generally not result in a detectable curing of the treated resin.

As stated above, after the acid-treated poly(phenylene sulfide) resin has been dried, it can optionally be cured. The curing process of a PAS resin generally entails subjecting the acid-tested resin to an elevated temperature, below its melting point, while in the presence of gaseous oxidizing atmosphere. Any suitable gaseous oxidizing atmosphere can be used. Examples of such include, but are not limited to, oxygen, any mixture of oxygen and an inert gas, such as nitrogen, or air. Generally, due to economic feasibility, air is often preferred. The curing temperature is generally in the range from about 1° C. to about 110° C. below the melting point of the treated resin, preferably, from about 14° C. to about 85° C. below the melting point of the treated resin.

Treating a virgin PAS resin in accordance with this invention results in an acid-treated resin which cures faster than its untreated counterpart. This result is desirable since it enables one to cure a PAS resin to a desired melt flow value either (a) in a shorter period of time and/or (b) at a lower curing temperature.

Another advantage of treating a virgin PAS resin in accordance with this invention is that an acid-treated PAS resin will have a melt flow value greater than its untreated counterpart. In other words, a virgin resin which has been acid-treated in accordance with this invention will have greater flowing tendencies (i.e., will be less viscous) than its untreated counterpart. This result is also desirable, especially if the PAS resin is to be employed for the encapsulating and/or coating of various objects.

Depending upon the specific acidic treating solution and/or the concentration of the acidic component used in treating a virgin PAS resin, the degree to which the melt flow value of the treated resin increases will vary. For example, if the same virgin PAS resin is acid-treated, the specific acidic treating solution employed can result in the melt flow value of the acid-treated resin being from about 50% to about 250% greater than the melt flow value of the resin's untreated counterpart. Since resins which are useful for encapsulation and/or coating purposes generally have melt flow values greater than about 15,000 g/10 min, when preparing a PAS resin suitable for encapsulation and/or coating purposes, the virgin PAS resin, prior to being treated, should have a melt flow value greater than 4500 g/10 min., preferably, greater than 6000 g/10 min., more preferably greater than 7500 g/10 min, and even more preferably greater than 9000 g/10 min.

The invention will still more fully be understood from the following examples. These examples are only intended to demonstrate select embodiments of the invention and are, in no way, intended to limit the scope thereof.

EXAMPLE I

This Example demonstrates treating a virgin poly(-phenylene sulfide) (henceforth PPS) resin, commercially available from Phillips Petroleum Company as Ryton ®, having a melting point of about 285° C. (545° F.) and an initial melt flow rate ranging from about 2,000 to about 6,000 g/10 min as determined by a modified ASTM D1238 Procedure B which uses a 5 minute preheat time (henceforth, modified ASTM D1238). In this example, a virgin PPS resin was treated by contacting a heated polymer slurry comprising the virgin PPS resin and distilled water, with an acidic treating solution.

To simulate commercial conditions, 800 grams of a PPS filter cake (i.e., approximately 400 grams virgin PPS resin and approximately 400 mL. distilled water) where charged to a stirred 2-gallon autoclave reactor. The polymeric filter cake was slurried by adding approximately 3.6 liters of distilled water to the autoclave rector. The aqueous polymer slurry was then heated to 185° C. (365° F.) while being stirred. After stirring the heated slurry for approximately 15 minutes at 185° C. (365° F.), 2.7 grams of glacial acetic acid were added to the reactor as the acidic treating solution. The amount of the acidic component present in the acidic treating solution (i.e., 2.7 grams) is approximately 0.067 weight percent of the sum of the weights of the distilled water present in the filter cake (i.e., 400 ml), the water added to slurry the filter cake (i.e., 3.6 liters), and the acidic treating solution (i.e., 2.7 grams glacial acetic acid).

While the virgin PPS resin was being treated with the acidic treating solution, the temperature of the reactor's contents was maintained at about 185° C. (365° F.). The treating process continued for approximately one hour, after which time the reactor's contents were cooled to approximately 21° C. (70° F.). The acid-treated PPS resin was recovered from the polymer slurry by filtration. The acid-treated recovered PPS resin was then washed several times with distilled water and allowed to dry at 121° C. (250° F.) for approximately 4 hours while purging the drying vessel with nitrogen gas. Hereinafter, this resin will be referred to as Resin 1.

A series of 12-gram samples of Resin 1 were cured by being heated to 264° C. (507° F.) and being maintained at that temperature for a period of time not exceeding 6 hours while in the presence of air. At various time intervals, during the curing period, one sample, from the series of 12-gram samples, was removed from the oven. The melt flow value of this particular 12-gram sample of Resin 1 was measured according to modified ASTM D1238. The observed results were recorded in Table I.

Two additional samples of the same virgin PPS resin were contacted by an acidic treating solution, recovered, dried and cured in accordance with the same procedure as set out for Resin 1. The resulting acid-treated PPS resins will be referred to as Resins 2 and 3. The only significant difference between the acid-treatment of Resin 1 and that of the remaining two resin samples was the amount of glacial acetic acid added. Specifically, Resin 2 was treated with 4.5 grams of glacial acetic acid resulting in a 0.112 weight percent solution; and Resin 3 was treated with 5.4 grams of glacial acetic acid resulting in a 0.13 weight percent solution. The varying concentrations of the acidic components employed and the resulting melt flow values of their respective acid-treated resins at varying time intervals during the curing process are also recorded in Table I.

For the purposes of demonstrating the effectiveness of this invention, the melt flow values of a control resin (hereinafter referred to as Resin 4), which was washed with distilled water at the elevated temperature as opposed to being treated by an acidic treating solution, are also recorded in Table I.

TABLE I

| | | Effect of Contacting a Virgin PPS Resin with an Acidic Treating Solution on Rate of Cure | | | | | | | | | | |
|---|---|---|---|---|---|---|---|---|---|---|---|---|
| Resin No. | Wash Agent | PPS Flow Rate[3] (g/10 min.) After Heating at 507° F. in the Presence of Air for: | | | | | | | | | | |
| | | 0 Hr. | 0.5 Hr. | 1 Hr. | 1.25 Hrs. | 1.5 Hrs. | 2 Hrs. | 2.5 Hrs. | 3 Hrs. | 4 Hrs. | 5 Hrs. | 6 Hrs. |
| 1 | 0.067 wt. % HOAc[1] (invention) | —[2] | 640 | 210 | — | 105 | 28 | — | — | — | — | — |
| 2 | 0.112 wt. % HOAc (invention) | — | 700 | 155 | — | 66 | 12 | — | — | — | — | — |
| 3 | 0.13% HOAc (invention) | — | 400 | — | 32 | — | — | 1 | — | — | — | — |
| 4 | H$_2$O (control) | 4650 | — | 160 | — | — | 69 | — | 35 | 25 | 20 | 15 |

[1]Acetic acid
[2]Dashes "—" represent that the melt flow value for the given resin at that specific time interval was not available.
[3]Flow rate determined in accordance with modified ASTM D1238.

Figure 2:
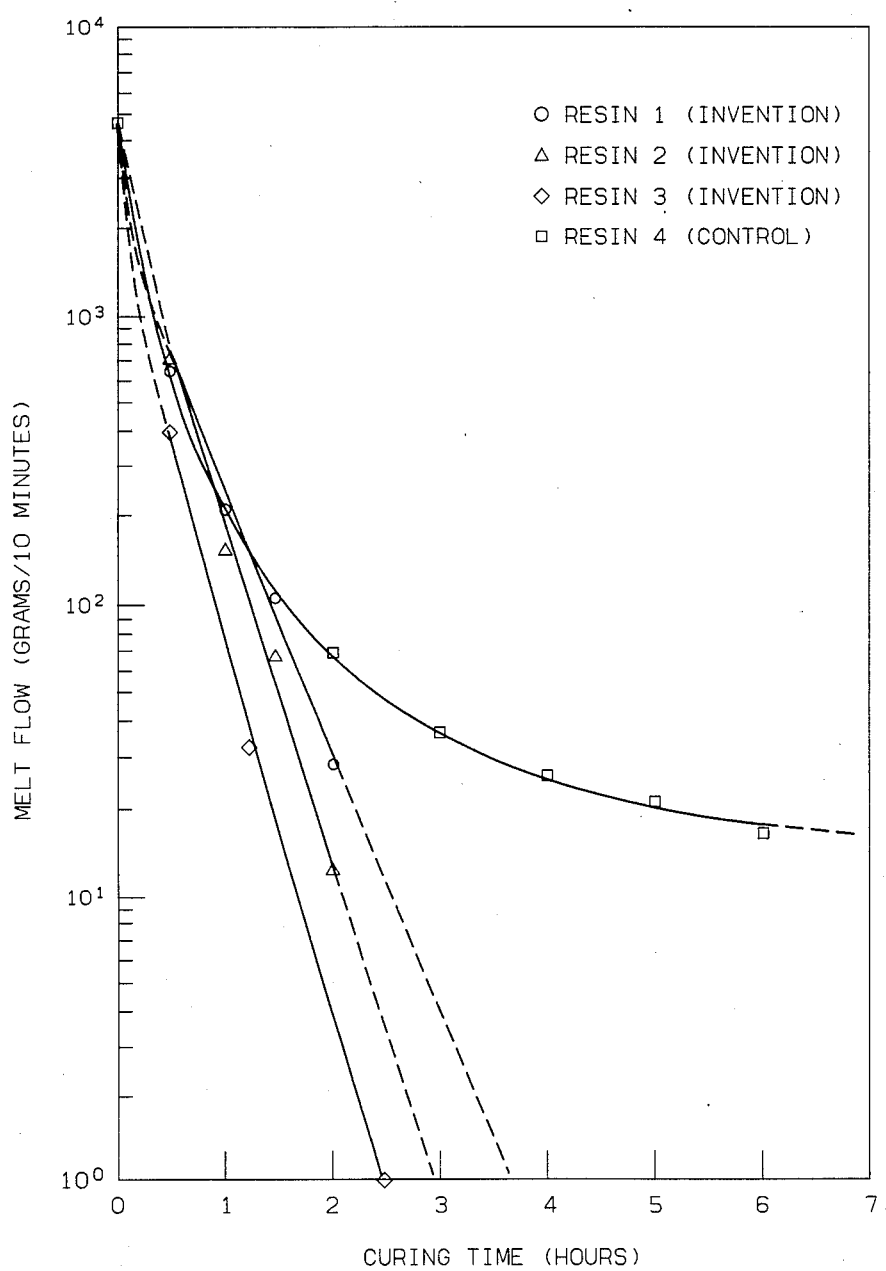
FIG. 2 is a semi-log graph demonstrating the effectiveness of contacting a heated polymer slurry, comprising a virgin poly(arylene sulfide) resin and water, with an acidic treating solution, by plotting the hours necessary to cure an acid-treated PAS resin to particular melt flow values and comparing these values with the time necessary to cure the untreated PAS resins under identical conditions.

To visually implement the demonstration of the invention's effectiveness, the data from Table I has been plotted on the graph shown in FIG. 2. Specifically, FIG. 2 plots the melt flow valve of a PPS resin as a function of the time the resin was subjected to the set curing conditions. This plot demonstrates the rate at which the resin cures under the specific conditions.

When comparing the melt flow values of inventive Resins 1-3 with those of control Resin 4, the data clearly demonstrates that contacting a heated polymer slurry, comprising a virgin PPS resin, with an acidic treating solution results in a pronounced acceleration of the rate at which the PPS resin cures. Specifically, under the set curing conditions, inventive Resins 1, 2 and 3 were cured to a melt flow value of 15 g/10 min in 1.6 hours, 1.9 hours, and 2.4 hours respectively. However, under the same curing conditions, it took 6 hours to cure control Resin 4 to a melt flow value of 15 g/10 min.

EXAMPLE II

This Example demonstrates treating a virgin poly(-phenylene sulfide) (henceforth PPS) resin, commercially available as Ryton ®, having a melting point of about 285° C. (425° F.) and a melt flow rate ranging from about 2,000 to about 6,000 g/10 min. as determined by modified ASTM D1238. In this example, the virgin PPS resin was treated by slurrying a virgin PPS resin with an acidic treating solution and then subjecting the slurry to an elevated temperature below the melting point of the virgin PPS resin.

To simulate commercial conditions, 800 grams of a PPS filter cake (i.e., approximately 400 grams virgin PPS resin and approximately 400 mL. distilled water) were charged to a stirred 2-gallon autoclave reactor. The PPS filter cake was slurried by adding approximately 3.6 liters of a 0.05 weight percent aqueous acetic acid solution (HOAc) to the autoclave reactor. In this example, the acidic treating solution consisted of 4 liters of a 0.04 weight percent aqueous acetic acid solution (i.e., 3.6 liters of 0.05 wt. percent acetic acid and 400 ml of distilled water present in the filter cake). The polymer slurry was then heated to 185° C. (365° F.) while being stirred.

The treating process continued for approximately one hour, at 185° C. (365° F.), after which time the aqueous polymer slurry was cooled to approximately 21° C. (70° F.). The acid-treated PPS resin was recovered from the slurry by filtration. The recovered PPS resin was then washed several times with distilled water and allowed to dry at 121° C. (250° F.) for approximately 4 hours while purging the drying vessel with nitrogen gas. Hereinafter, this resin will be referred to as Resin 5.

A series of 12-gram samples of Resin 5 were cured by being heated to 264° C. (507° F.) and being maintained at that temperature for a period of time not exceeding 6 hours, while in the presence of air. At various time intervals during this curing period, one sample, from the series of 12-gram samples, was removed from the oven. The melt flow value of this particular 12-gram sample of Resin 5 was measured according modified ASTM D1238. The observed results are recorded in Table II.

Five additional samples of the same virgin PPS resin were contacted by an acidic treating solution, recovered, dried and cured in accordance with the same procedure as set out for Resin 5. The resulting acid-treated PPS resins will be referred to as Resins 6-10. The only significant difference between the acid-treatment of Resin 5 and that of the remaining five resin samples, was the acidic treating solution added. Specifically, Resins 6-8 were treated with varying concentrations of an aqueous acetic acid solution; Resin 9 was treated with an aqueous hydrochloric acid solution; and Resin 10 was treated by adding carbon dioxide to the autoclave reactor. The varying concentrations of the acidic components present in the respective acidic treating solution and the resulting melt flow values of their respective acid-treated resins at varying time intervals during the curing process are also recorded in Table III.

For the purpose of demonstrating the effectiveness of this invention, the melt flow values of the control resin from Example I (i.e., Resin 4) are also recovered in Table II.

TABLE II

Effect of Contacting a Virgin PPS Resin with an Acidic Treating Solution on Rate of Cure

| Resin No. | Wash Agent | PPS Flow Rate[1] (g/10 min.) After Heating at 507° F. in the Presence of Air for: | | | | | | | | | | |
|---|---|---|---|---|---|---|---|---|---|---|---|---|
| | | 0 Hr. | 0.5 Hr. | 0.75 Hr. | 1 Hr. | 1.5 Hrs. | 2 Hrs. | 2.5 Hrs. | 3 Hrs. | 4 Hrs. | 5 Hrs. | 6 Hrs. |
| 4 | H$_2$O (control) | 4650 | —[2] | — | 160 | — | 67 | — | 35 | 25 | 20 | 15 |
| 5 | 0.045% HOAc[3] (invention) | — | — | — | 270 | — | 62 | — | 7 | — | — | — |
| 6 | 0.09% HOAc (invention) | 9250 | 345 | — | 30 | — | — | — | — | — | — | — |
| 7 | 0.22% HOAc (invention) | 15375 | 200 | — | 20 | 3 | — | — | — | — | — | — |
| 8 | 0.45% HOAc (invention) | — | 200 | — | 30 | 3 | — | — | — | — | — | — |
| 9 | 0.09% HCl (invention) | — | 330 | 65 | 17 | — | — | — | — | — | — | — |
| 10 | 0.45% CO$_2$ (invention) | — | 440 | 340 | 230 | 72 | 22 | 12 | — | — | — | — |

[1] See footnote 3 of Table I.
[2] See footnote 2 of Table I.
[3] See footnote 1 of Table I.

Figure 3:
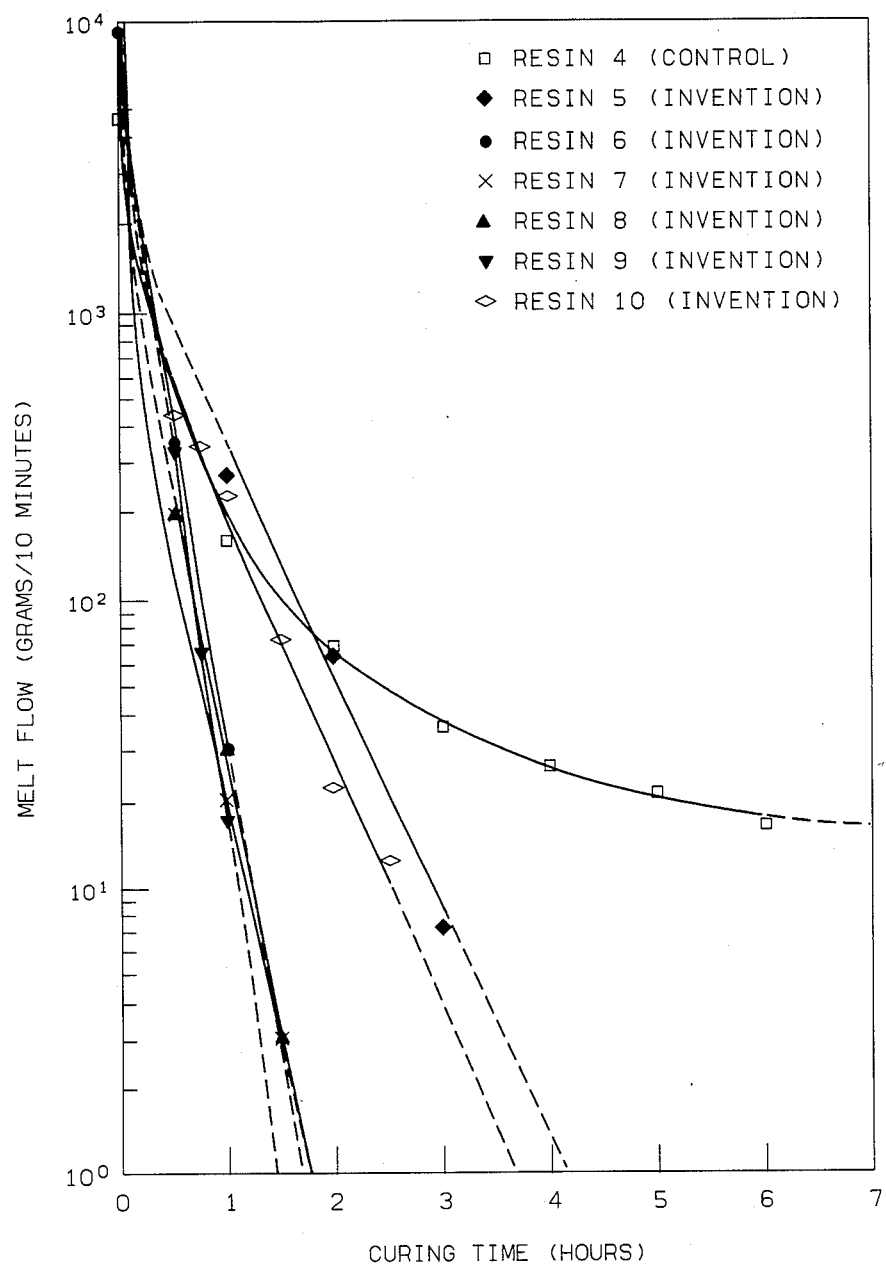
FIG. 3 is a semi-log graph demonstrating the effectiveness of treating a virgin poly(arylene sulfide) resin, by slurrying the virgin resin in an acidic treating solution and then subjecting the polymer slurry to an elevated temperature, by plotting the hours necessary to cure particular PAS resin to particular melt flow values and comparing these values with the time necessary to cure the untreated PAS resin under identical conditions.

To visually demonstrate this invention's effectiveness, the data from Table II has been plotted on the graph shown in FIG. 3. Specifically, FIG. 3 plots the melt flow values of a PPS resin as a function of the time the resin was subjected to the set curing conditions. This plot demonstrates the rate at which the resin cures under the specific conditions.

When comparing the melt flow values of inventive Resins 5-10 with those of control Resin 4, the data clearly demonstrates that slurrying a virgin PPS resin in an acidic treating solution and then heating the polymer slurry to a temperature below the melting point of the resin, results in a pronounced acceleration of the rate at which a PPS resin cures. Specifically, under the set curing conditions, inventive Resins 5-10 were cured to a melt flow value of 20 g/10 min in 2.6 hours, 1.2 hours, 1.0 hours, 1.2 hours, 1.9 hours and 2.2 hours respectively. However, under the same curing conditions, it took 5 hours to cure control Resin 4 to a melt flow value of 20 g/10 min.

EXAMPLE III

This example provides data which demonstrates the thermal stability of a virgin poly(phenylene sulfide) (henceforth PPS) resin, commercially available as Ryton ®, after the virgin PPS resin had been contacted by an acidic treating solution in accordance with the procedure set out in Example II. In this example, the thermal stabilities of seven acid-treated PPS resin (Resins 11-17, inclusive) were assessed by noting the changes in the respective melt flow values for each Resin after being maintained at 315° C. (600° F.), in the barrel of the melt index apparatus of ASTM D1238, for 5 minutes and for 30 minutes.

Resins 11-13 were individually prepared by slurrying 800 grams of a wet PPS filter cake (i.e., approximately 400 grams virgin PPS resin and 400 ml distilled water) in 3.6 liters of a 0.5 weight percent acetic acid solution. In the preparation of Resins 11-13, the acidic treating solution consisted of 4 liters of a 0.45 weight percent aqueous acetic acid solution (i.e., 3.6 liters of 0.5 wt. percent acetic acid and 400 ml of distilled water present in the filter cake). While stirring, each of the slurries were heated to 185° C. (365° F.) and maintained at that temperature for approximately one hour. The slurries were then cooled and the acid-treated PPS resin was recovered therefrom. The recovered acid-treated PPS resin was washed several times with distilled water and allowed to dry at 121° C. (250° F.) for approximately 4 hours while purging the drying vessel with nitrogen gas.

The thermal stability of each of Resins 11-13 was then observed and recorded at various degrees of cure. Specifically, the data associated with Resin 11 is that of an acid-treated PPS resin, after the Resin had been cured at 264° C. (507° F.) for 0.25 hr. The data associated with Resin 12 is that of an acid-treated PPS resin, after the Resin had been cured at 264° C. (507° F.) for 0.5 hr. The data associated with Resin 13 is that of an acid-treated PPS resin, after the Resin had been cured at 264° C. (507° F.) for 0.25 hr.

Resins 14-17 were prepared in accordance with the same procedure as set out above for Resins 11-13 except that Resins 14-17 were prepared by slurrying the PPS filter cake with 3.6 liters of a 0.1 weight percent acetic acid solution. In the preparation of Resins 14-17, the acidic treating solution consisted of 4 liters of a 0.09 weight percent aqueous acetic acid solution (i.e., 3.6 liters of 0.1 wt. percent acetic acid and 400 ml of water present in the filter cake).

The thermal stability of each of Resins 14-17 was the observed and recorded at various degrees of cure. Specifically, the data associated with Resin 14 is that of an acid-treated PPS resin, after the Resin has been cured at 264° C. (507° F.) for 0.75 hr. The data associated with Resin 15 is that of an acid-treated PPS resin, after the Resin had been cured at 264° C. (507° F.) for 1 hr. The data associated with Resin 16 is that of an acid-treated PPS resin after the resin had been cured at 264° C. (507° F.) for 1 hr. The data associated with Resin 17 is that of an acid-treated PPS resin after the resin had been cured at 264° C. (507° F.) for 1.25 hrs. The observed melt flow values of Resin 11-17 are recorded in Table III.

For the purposes of demonstrating the effectiveness of this invention, the thermal stability of a control resin sample (hereinafter referred to as Resin 18) was also determined. Control Resin 18 was prepared in accordance with the same procedure set out in Example II and washed with distilled water at the elevated temperature, as opposed to being treated with an acidic treating solution. Control Resin 18 was cured at 264° C. (507° F.) for 6 hours. The thermal stability of Resin 18 was then determined and is recorded in Table III.

TABLE III

Effect of Contacting a Virgin PPS Resin with an Acidic Treating Solution on Thermal Stability

| Resin No. | Treating Agent | Flow Rate[1] (g/10 min.) After 5 min. at 315° C. | Flow Rate[1] (g/10 min.) After 30 min. at 315° C. | Net Change (%) |
|---|---|---|---|---|
| 11 | 0.45 wt % HOAc[2] | 440 | 500 | 12 |
| 12 | 0.45 wt % HOAc | 237 | 219 | <8>[3] |
| 13 | 0.45 wt % HOAc | 418 | 540 | 30 |
| 14 | 0.09 wt % HOAc | 207 | 238 | 15 |
| 15 | 0.09 wt % HOAc | 98 | 95 | <3> |
| 16 | 0.09 wt % HOAc | 45 | 59 | 31 |
| 17 | 0.09 wt % HOAc | 14 | 9 | <36> |
| 18 | $H_2O$ (control) | 67 | 75 | 12 |

[1] See footnote 3 of Table I.
[2] See footnote 1 of Table I.
[3] Brackets < > denote a negative value.

The data in Table III clearly demonstrates that, regardless of the desired degree of cure, the melt flow values of inventive Resins 11-17, after 30 minutes do not vary by more than ±40 percent from their respective melt flow values after 5 minutes. As stated earlier, for purposes of this invention, if the melt flow value of a PAS resin changes by less than ±50 percent, the resin is said to be thermally stable. Therefore, this example demonstrates that slurrying a virgin PPS resin in an acidic treating solution and then heating the slurry to a temperature below the virgin resin's melting point does not substantially affect the thermal stability of the resin.

EXAMPLE IV

As stated earlier, the rate at which a poly(arylene sulfide) resin cures is directly proportional to the temperature at which the resin is cured. This example illustrates that, regardless of the curing temperature, virgin PAS resins, which have been acid-treated in accordance with this invention, cure faster than their untreated counterpart. The PAS resin used to demonstrate this feature of the invention is a virgin poly(phenylene sulfide) henceforth "PPS", commercially available under the trade name Ryton ® having a melting point of 285° C. (545° F.) and a melt flow value within the range from about 2,000 g/10 min. to about 6,000 g/10 min. according to modified ASTM D1238.

To simulate commercial conditions, 800 grams of a PPS filter cake (i.e., approximately 400 grams virgin PPS resin and approximately 400 mL. distilled water), were charged to a stirred 2-gallon autoclave reactor. The filter cake was then slurried by adding approximately 3.6 liters of a 0.1 weight percent aqueous acetic acid solution (HOAc), to the autoclave reactor. In this example, the acidic treating solution consisted of 4 liters of a 0.09 weight percent aqueous acetic acid solution (i.e., 3.6 liters of 0.1 wt. percent acetic acid and 400 ml of water present in the filter cake). The polymer slurry was then heated to 185° C. (365° F.) while being stirred.

The treating process continued for approximately one hour, at 185° C. (365° F.), after which time the polymer slurry was cooled to approximately 21° C. (70° F.).

The acid-treated PPS resin was recovered from the polymer slurry by filtration. The recovered PPS resin was then washed several times with distilled water and allowed to dry at 121° C. (250° F.) for approximately 4 hours while purging the drying vessel with nitrogen gas. Hereinafter, this resin will be referred to as Resin 19.

Six 12-gram samples of Resin 19 were cured by being heated at various temperatures for various time periods while in the presence of air. The final melt flow value for each of these six Resin 19 cured samples was measure, at the end of their respective curing period, according to modified ASTM D1238. The observed results are recorded in Table IV.

In order to demonstrate the effectiveness of this invention, a control resin (henceforth Resin 20) was prepared by being washed with distilled water at the elevated temperature, as opposed to being treated with an acidic treating solution. Six 12-gram samples of control Resin 20 were cured for the same time and at the same temperature as each of the six Resin 19 samples. The final melt flow value of each of the six Resin 20 cured samples was measured, at the end of their respective curing period, according to modified ASTM D1238. The observed results are also recorded in Table IV.

had an initial melt flow value of approximately 13,500 g/10 minutes as determined by modified ASTM D1238.

To simulate commercial conditions, 800 grams of a PPS filter cake (i.e. 400 grams of the above PPS resin and 400 mL distilled water) were charged into a stirred 2-gallon autoclave reactor. The polymeric filter cake was slurried by adding approximately 2 liters of a 0.2 weight percent aqueous acetic acid solution (HOAc) to the autoclave reactor. In this example, the acidic treating solution consisted of 2.4 liters of a 0.17 weight percent aqueous acetic acid solution (i.e., 2 liters of 0.2 wt. percent acetic acid and 400 ml of water present in the filter cake). The polymer slurry was then heated to 185° C. (365° F.) while being stirred.

The treating process continued for approximately one hour, at 185° C. (365° F.), after which time the polymer slurry was cooled to approximately 21° C. (70° F.). The acid-treated PPS resin was recovered from the polymer slurry by filtration. The recovered PPS resin was then washed several times with distilled water and allowed to dry at 121° C. (250° F.) for approximately 4 hours while purging the drying vessel with nitrogen gas. Hereinafter, this resin will be referred to as Resin 21. The melt flow value of Resin 21 was then measured according to modified ASTM D1238. This value is recorded in Table V.

For the purposes of demonstrating the effectiveness of this invention, the melt flow value of a control resin (henceforth Resin 22), which was washed with distilled

TABLE IV

Effect of Temperature and Time on Curing Acid-treated Polymers

| Resin No. | Melt Flow[1] (g/10 min) After Curing at Temperature (time) | | | | | | |
|---|---|---|---|---|---|---|---|
| | (Initial) | 375° F. (75 Hrs.) | 425° F. (30 Hrs.) | 400° F. (3 Hrs.) | 425° F. (25 Hrs.) | 475° F. (3 Hrs.) | 507° F. (6 Hrs.) |
| 19 (invention) | 6450 | 95 | —[2] | 930 | 0 | 10 | 0 |
| 20 (control) | 4200 | 379 | 303 | 660 | 130 | 140 | 15 |

[1]See footnote 3 of Table I.
[2]See footnote 2 of Table I.

The data in Table IV demonstrates that contacting a virgin PPS resin with an acidic treating solution results in a faster curing resin. Specifically, when the acid-treated PPS Resin 19 was subjected to the same curing conditions as control Resin 20, the resulting melt flow value of inventive Resin 19 was significantly lower than that of control Resin 20. It should be noted that while the melt flow value of inventive resin 19 was greater than that of control Resin 20 when the resins were air cured at 400° F. for 3 hours, it is believed that as curing time increases the curing of Resin 19 will accelerate faster than the curing of Resin 20.

EXAMPLE V

This Example demonstrates a method of treating a virgin poly(arylene sulfide) resin, such that the treated resin can be used for encapsulation and/or coating purposes. Specifically, this example demonstrates that treating a virgin poly(phenylene sulfide) resin (henceforth PPS), having an initial melt flow value ranging from about 10,000 g/10 min. to about 14,500 g/10 min, with an acidic treating solution, results in an acid-treated PPS resin having an initial melt flow value ranging from about 15,000 g/10 min. to about 35,000 g/10 min.

The virgin PPS resin used in this example was prepared in a 90-gallon stirred polymerization reactor and water at the elevated temperature, as opposed to being treated by an acidic treating solution, is also recorded in Table V. Control Resin 22 was prepared using the same virgin PPS resin employed in the preparation of Resin 21.

TABLE V

Effect of Acid-Treating a Polymer on Melt Flow Value[1]

| Resin No. | Treating Agent | Melt Flow[2] (g/10 min.) |
|---|---|---|
| 21 (invention) | 0.17 wt. % HOAc[3] | 24,750 |
| 22 (control) | Water | 13,800 |

[1]See footnote 3 of Table I.
[2]The melt flow was determined after the resin had been recovered and dried but before the resin had been subjected to oxidizing conditions.
[3]See footnote 1 of Table I.

The data in Table V demonstrates that without acid-treatment control Resin 22 had a melt flow value of 13,800 g/10 min. Resin 22 will not be suitable for encapsulation purposes due to its melt flow value being too low. However, after acid-treatment, the same PPS resin (i.e., Resin 21) has a melt flow value of 24,750 g/10 min. Resin 21 will be suitable for encapsulation purposes since it has a melt flow value greater than 15,000 g/10 min.

Therefore, this example demonstrates that a virgin PPS resin, which is initially not suitable for encapsulation and/or coating purposes, can be converted to a suitable encapsulation resin by contacting the virgin PPS resin with an acidic treating solution in accordance with the embodiments of this invention.

EXAMPLE VI

This Example further demonstrates the effectiveness of this invention by providing data illustrating the thermal stability of inventive Resin 21 of Example V.

A 12-gram sample of resin 21 of Example V was cured by being heated to 264° C. (507° F.) for 2.5 hours while being exposed to air. The thermal stability of cured Resin 21 was then asserted by noting the changes in the melt flow values after the Resin has been maintained at 315° C. (600° F.), while in the barrel of the melt index apparatus of ASTM D1238, for 5 minutes and for 30 minutes. The 5 minute and 30 minute melt flow values of cured Resin 21 are recorded in Table VI.

TABLE VI

Thermal Stability of a PPS Resin Contacted by an Acidic Treating Solution

| Resin No. | Treating Agent | Melt Flow[1] (g/10 min) | | Net Change (%) |
|---|---|---|---|---|
| | | After 5 min. at 316° C. | After 30 min. at 316° C. | |
| 21 | 0.17 wt % HOAc[2] | 1136 | 1430 | 26 |

[1]See footnote 3 of Table I.
[2]See footnote 1 of Table I.

As stated earlier, for purposes of this invention, if the melt flow value of a PAS resin changes by less than +50 percent, the resin is said to be thermally stable. Therefore, the data of Table VI demonstrates that contacting a virgin PPS resin with an acidic treating solution will not substantially affect the thermal stability of the resin.

It is evident from the foregoing that various modifications can be made to the embodiments of this invention without departing from the spirit and scope thereof which will be apparent to those skilled in nthe art. Having thus described the invention, it is claimed as follows.

That which is claimed is:

1. A process for treating a virgin poly(arylene sulfide) resin comprising:
    (a) contacting said virgin resin with an aqueous acidic treating solution to form an aqueous acidic polymer slurry, wherein said acidic treating solution comprises an acidic component and an aqueous component and the concentration of said acidic component in said acidic treating solution is less than the amount necessary to result in at least a partial curing of the virgin poly(arylene sulfide) resisn,
    (b) treating said virgin poly(arylene sulfide) resin by heating said polymer slurry mixture, while in the substantial absence of a gaseous oxidizing atmosphere, to an elevated temperature below the melting point of said virgin resin, and
    (d) recovering said acid-treated poly(arylene sulfide) resin from said polymer slurry in a manner which does not result in at least a partial curing of said acid-treated poly(arylene sulfide) resin.

2. A process as in claim 1 wherein, prior to slurrying said virgin resin with said acidic treating solution, said virgin resin is recovered from a polymerization reaction effluent comprising said virgin poly(arylene sulfide) resin, salt, a polar organic compound and water.

3. A process as in claim 1 wherein, after said acid-treated resin is recovered from said polymer slurry, said acid-tested resin is dried, while in the substantial absence of a gaseous oxidizing atmosphere, at an elevated temperature below the melting point of said acid-treated resin.

4. A process as in claim 1 wherein, after said acid-tested resin is recovered from said polymer slurry, said acid-tested resin is dried at a temperature not exceeding 100° C. and under vacuum conditions sufficient to vaporize any liquid component.

5. A process as in claim 3 wherein, after said acid-treated resin is dried, said acid-treated resin is heated to an elevated temperature, below the melting point of said acid-treated resin, while in the presence of a gaseous oxidizing atmosphere.

6. A process as in claim 5 wherein said gaseous oxidizing atmosphere is air.

7. A process as in claim 4 wherein, after said acid-treated resin is dried, said acid-treated resin is heated to an elevated temperature, below the melting point of said acid-treated resin, while in the presence of a gaseous oxidizing atmosphere.

8. A process as in claim 7 wherein said gaseous oxidizing atmosphere is air.

9. A process as in claim 1 wherein said polymer slurry is heated to a temperature within the range from about 1° C. to about 175° C. below the melting point of said virgin resin.

10. A process as in claim 9 wherein said polymer slurry is heated to a temperature within the range from about 14° C. to about 150° C. below the melting point of said virgin resin.

11. A process as in claim 1 wherein the concentration of said acidic component in said acidic treating solution ranges from about 0.01 weight percent to about 10 weight percent, said weight percentages being based on the total weight of said acidic treating solution.

12. A process as in claim 11 wherein the concentration of said acidic component in said acidic treating solution ranges from about 0.025 weight percent to about 5 weight percent, said weight percentages being based on the total weight of said acidic treating solution.

13. A process as in claim 12 wherein the concentration of said acidic component in said acidic treating solution ranges from about 0.075 weight percent to about 1 weight percent, said weight percentages being based on the total weight of said acidic treating solution.

14. A process as in claim 1 wherein said acidic treating solution is an organic acid.

15. A process as in claim 14 wherein said organic acid is selected from the group comprising acetic acid, formic acid, oxalic acid, fumaric acid, and monopotassium phthalic acid.

16. A process as in claim 15 wherein said organic acid is acetic acid.

17. A process as in claim 1 wherein said acidic treating solution is an inorganic acid.

18. A process as in claim 17 wherein said inorganic acid is selected from the group comprising hydrochloric acid, monoammonium phosphate, sulfuric acid, phosphoric acid, boric acid, nitric acid, sodium dihydrogen phosphate, carbonic acid, and $H_2SO_3$.

19. A process as in claim 18 wherein said inorganic acid is hydrochloric acid.

20. A process as in claim 1 wherein the concentration of said virgin resin in said polymer slurry ranges from about 1 weight percent to about 50 weight percent, said weight percentages being based on the total weight of said polymer slurry.

21. A process as in claim 20 wherein the concentration of said virgin resin in said polymer slurry ranges from about 5 weight percent to about 40 weight percent, said weight percentages being based on the total weight of said polymer slurry.

22. A process as in claim 21 wherein the concentration of said virgin resin in said polymer slurry ranges from about 9 weight percent to about 20 weight percent, said weight percentages being based on the total weight of said polymer slurry.

23. A process as in claim 1 wherein, prior to contacting said virgin resin with said acidic treating solution, said virgin resin has a melt flow value of at least 4,500 grams/10 minutes.

24. A process as in claim 23 wherein, prior to contacting said virgin resin with said acidic treating solution, said virgin resin has a melt flow value of at least 6,000 grams/10 minutes.

25. A process as in claim 24 wherein, prior to contacting said virgin resin with said acidic treating solution, said virgin resin has a melt flow value of at least 7,500 grams/10 minutes.

26. A process as in claim 25 wherein, prior to contacting said virgin resin with said acidic treating solution, said virgin resin has a melt flow value of at least 9,000 grams/10 minutes.

27. A process as in claim 1 wherein said virgin poly(arylene sulfide) is poly(phenylene sulfide).

28. A process as in claim 1 wherein said aqueous acidic treating solution has a pH greater than 1.0.

29. A process as in claim 28 wherein said aqueous acidic treating solution has a pH greater than 2.0.

30. A process as in claim 29 wherein said aqueous acidic treating solution has a pH greater than 4.0

31. A process for treating a virgin poly(arylene sulfide) resin comprising:
(a) contacting said virgin resin with water to form a polymer slurry,
(b) heating said polymer slurry, while in the substantial absence of a gaseous oxidizing atmosphere, to an elevated temperature below the melting point of said virgin resin,
(c) treating said virgin poly(arylene sulfide) resin by adding to said polymer slurry, while in the substantial absence of a gaseous oxidizing atmosphere, an acidic treating solution, comprising an acidic component and an aqueous component, wherein the amount of said acidic component in said acidic treating solution is less than the amount necessary to result in at least a partial curing of said virgin resin, and
(e) recovering said acid-treated poly(arylene sulfide) resin from said polymer slurry in a manner which does not result in at least a partial curing of said acid-treated poly(arylene sulfide) resin.

32. A process as in claim 31 wherein, prior to slurrying said virgin resin with said water, said virgin resin is recovered from a polymerization reaction effluent comprising said virgin poly(arylene sulfide) resin, salt, a polar organic compound and water.

33. A process as in claim 31 wherein, after said acid-treated resin is recovered from said polymer slurry, said acid-tested resin is dried, while in the substantial absence of a gaseous oxidizing atmosphere, at an elevated temperature below the melting point of said acid-treated resin.

34. A process as in claim 31 wherein, after said acid-treated resin is recovered from said polymer slurry, said acid-tested resin is dried at a temperature not exceeding 100° C. and under vacuum conditions sufficient to vaporize any liquid component.

35. A process as in claim 33 wherein, after said acid-treated resin is dried, said acid-treated resin is heated to an elevated temperature, below the melting point of said acid-treated resin, while in the presence of a gaseous oxidizing atmosphere.

36. A process as in claim 35 wherein said gaseous oxidizing atmosphere is air.

37. A process as in claim 34 wherein, after said acid-treated resin is dried, said treated resin is heated to an elevated temperature, below the melting point of said acid-treated resin, while in the presence of a gaseous oxidizing atmosphere.

38. A process as in claim 37 wherein said gaseous oxidizing atmosphere is air.

39. A process as in claim 31 wherein said polymer slurry is heated to a temperature within the range from about 1° C. to about 175° C. below the melting point of said virgin resin.

40. A process as in claim 39 wherein said polymer slurry is heated to a temperature within the range from about 14° C. to about 150° C. below the melting point of said virgin resin.

41. A process as in claim 31 wherein the amount of said acidic component in said acidic treating solution ranges from about 0.01 weight percent to about 10 weight percent, said weight percentages being based on the sum of the weight of said acidic treating solution and said water.

42. A process as in claim 41 wherein the amount of said acidic component in said acidic treating solution ranges from about 0.025 weight percent to about 5 weight percent, said weight percentages being based on the sum of the weights of said acidic treating solution and said water.

43. A process as in claim 42 wherein the amount of said acidic component in said acidic treating solution ranges from about 0.075 weight percent to about 1 weight percent, said weight percentages being based on the sum of the weights of said acidic treating solution and said water.

44. A process as in claim 31 wherein said acidic treating solution is an organic acid.

45. A process as in claim 44 wherein said organic acid is selected from the group comprising acetic acid, formic acid, oxalic acid, fumaric acid, and monopotassium phthalic acid.

46. A process as in claim 45 wherein said organic acid is acetic acid.

47. A process as in claim 31 wherein said acidic treating solution is an inorganic acid.

48. A process as in claim 47 wherein said inorganic acid is selected from the group comprising hydrochloric acid, monoammonium phosphate, sulfuric acid, phosphoric acid, boric acid, nitric acid, sodium dihydrogen phosphate, carbonic acid, and $H_2SO_3$.

49. A process as in claim 48 wherein said inorganic acid is hydrochloric acid.

50. A process as in claim 31 wherein the concentration of said virgin resin in said polymer slurry ranges from about 1 weight percent to about 50 weight percent, said weight percentages being based on the total weight of said polymer slurry.

51. A process as in claim 50 wherein the concentration of said virgin resin in said polymer slurry ranges from about 5 weight percent to about 40 weight percent, said weight percentages being based on the total weight of said polymer slurry.

52. A process as in claim 51 wherein the concentration of said virgin resin in said polymer slurry ranges from about 9 weight percent to about 20 weight percent, said weight percentages being based on the total weight of said polymer slurry.

53. A process as in claim 31 wherein, prior to slurrying said virgin resin with said water, said virgin resin has a melt flow value of at least 4,500 grams/10 minutes.

54. A process as in claim 53 wherein, prior to slurrying said virgin resin with said water, said virgin resin has a melt flow value of at least 6,000 grams/10 minutes.

55. A process as in claim 54 wherein, prior to slurrying said virgin resin with said water, said virgin resin has a melt flow value of at least 7,500 grams/10 minutes.

56. A process as in claim 55 wherein, prior to slurrying said virgin resin with said water, said virgin resin has a melt flow value of at least 9,000 grams/10 minutes.

57. A process as in claim 31 wherein said virgin poly(arylene sulfide) is poly(phenylene sulfide).

58. A process as in claim 31 wherein said aqueous acidic treating solution has a pH greater than 1.0.

59. A process as in claim 58 wherein said aqueous acidic treating solution has a pH greater than 2.0.

60. A process as in claim 59 wherein said aqueous acidic treating solution has a pH greater than 4.

* * * * *